United States Patent
Ono (10) Patent No.: US 12,406,129 B2
(45) Date of Patent: Sep. 2, 2025

(54) METHOD FOR DESIGNING SEMICONDUCTOR INTEGRATED CIRCUIT, CIRCUIT DESIGN SYSTEM, AND CONTROL PROGRAM

(71) Applicant: KIOXIA CORPORATION, Tokyo (JP)

(72) Inventor: Yusuke Ono, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 512 days.

(21) Appl. No.: 17/895,938

(22) Filed: Aug. 25, 2022

(65) Prior Publication Data

US 2023/0205971 A1 Jun. 29, 2023

(30) Foreign Application Priority Data

Dec. 24, 2021 (JP) ................. 2021-210191

(51) Int. Cl.
*G06F 30/398* (2020.01)
*G06F 119/10* (2020.01)

(52) U.S. Cl.
CPC ........ *G06F 30/398* (2020.01); *G06F 2119/10* (2020.01)

(58) Field of Classification Search
CPC .................................................... G06F 30/398
USPC ...................................................... 716/111
See application file for complete search history.

(56) References Cited

U.S. PATENT DOCUMENTS

| | | | |
|---|---|---|---|
| 8,225,265 B2 | 7/2012 | Morgenshtein et al. | |
| 10,762,259 B1* | 9/2020 | Ershov | ............... G06F 30/30 |
| 2013/0117001 A1 | 5/2013 | Goo | |
| 2014/0019930 A1 | 1/2014 | Yuh | |
| 2014/0123086 A1 | 5/2014 | Buck | |
| 2017/0122998 A1 | 5/2017 | Liu | |

FOREIGN PATENT DOCUMENTS

| | | |
|---|---|---|
| CN | 101923595 A | 12/2010 |
| CN | 103544333 A | 1/2014 |
| CN | 103793548 A | 5/2014 |
| JP | 2002093912 A | 3/2002 |
| JP | 3971105 B2 | 9/2007 |
| TW | 201723904 A | 7/2017 |

* cited by examiner

*Primary Examiner* — Eric D Lee
(74) *Attorney, Agent, or Firm* — Kim & Stewart LLP (57) ABSTRACT

According to one embodiment, a method for designing a semiconductor integrated circuit acquires a first simulation result by circuit simulation including a first kind of parasitic element and a second kind of parasitic element to be evaluated for a first net and a second net. A net selection circuit is generated including just one kind of parasitic element on one net selected from the first net and the second net and the two kinds of parasitic elements on the other nets, and a net selection simulation result is acquired by circuit simulation for each of the net selection circuits.

20 Claims, 6 Drawing Sheets

| No | CIRCUIT | Vout [V] | Iout [mA] | EFFICIENCY [%] |
|---|---|---|---|---|
| 1 | HAVING ALL PARASITIC ELEMENTS | 6.0 | 8.00 | 66.7 |
| 2 | netA WITHOUT Rp | 6.0 | 8.05 | 67.1 |
| 3 | netA WITHOUT Cp | 6.0 | 8.10 | 67.5 |
| 4 | netB WITHOUT Cp | 6.0 | 8.15 | 67.9 |
| 5 | netC WITHOUT Rp | 6.0 | 8.20 | 68.3 |
| 6 | netD WITHOUT Cp | 6.0 | 8.70 | 72.5 |
| 7 | netC WITHOUT Cp | 6.0 | 8.75 | 72.9 |
| 8 | netB WITHOUT Rp | 6.0 | 8.80 | 73.3 |
| 9 | netD WITHOUT Rp | 6.0 | 8.85 | 73.8 |

| No | CIRCUIT | Vout [V] | Iout [mA] | EFFICIENCY [%] |
|---|---|---|---|---|
| 1 | HAVING ALL PARASITIC ELEMENTS | 6.0 | 8.00 | 66.7 |
| 2 | netB WITHOUT M1_Rp | 6.0 | 8.05 | 67.1 |
| 3 | netB WITHOUT VIA_Rp | 6.0 | 8.10 | 67.5 |
| 4 | netD WITHOUT M1_Rp | 6.0 | 8.15 | 67.9 |
| 5 | netD WITHOUT VIA_Rp | 6.0 | 8.20 | 68.3 |
| 6 | netB WITHOUT M2_Rp | 6.0 | 8.25 | 68.8 |
| 7 | netD WITHOUT M2_Rp | 6.0 | 8.30 | 69.2 |

METHOD FOR DESIGNING SEMICONDUCTOR INTEGRATED CIRCUIT, CIRCUIT DESIGN SYSTEM, AND CONTROL PROGRAM

CROSS-REFERENCE TO RELATED APPLICATION

This application is based upon and claims the benefit of priority from Japanese Patent Application No. 2021-210191, filed Dec. 24, 2021, the entire contents of which are incorporated herein by reference.

FIELD

Embodiments described herein relate generally to a method for designing a semiconductor integrated circuit, a circuit design system, and a control program.

BACKGROUND

A net list describing circuit elements in a semiconductor integrated circuit and the connection relation between these circuit elements is generated from the data for a mask layout of the semiconductor integrated circuit. By analyzing the net list of the semiconductor integrated circuit, a circuit element having a large influence on a circuit characteristic (also called a 'critical element') can be identified. For example, a value such as a gate length or a gate width of a metal-oxide-semiconductor (MOS) transistor can be varied to identify a critical element. The circuit characteristics can be improved by changing the mask layout so as to reduce the influence of the critical element.

In a semiconductor integrated circuit, a parasitic element can be parasitic with respect to a wiring on which an electric signal propagates between the circuit elements. The parasitic element affects the circuit characteristics.

DETAILED DESCRIPTION

Embodiments concern a method for designing a semiconductor integrated circuit according to an outputting of the degree influence of a parasitic element on a circuit characteristic. A corresponding circuit design system and a control program are also provided as embodiments.

In general, according to one embodiment, there is provided a method for designing a semiconductor integrated circuit. A first simulation result is acquired by circuit simulation including a first kind of parasitic element and a second kind of parasitic element to be evaluated for a net in the semiconductor integrated circuit as described by a net list including a first net and a second net. A first net selection circuit including only the first kind of parasitic element on the first net and the first kind of parasitic element and the second kind of parasitic element on the second net is generated. A second net selection circuit including only the second kind of parasitic element on the first net and the first kind of parasitic element and the second kind of parasitic element on the second net is generated. A third net selection circuit including the first kind of parasitic element and the second kind of parasitic element on the first net and only the first kind of parasitic element on the second net is generated. A fourth net selection circuit including the first kind of parasitic element and the second kind of parasitic element on the first net and only the second kind of parasitic element on the second net is generated. A second simulation result is acquired for the first net selection circuit. A third simulation result is acquired for the second net selection circuit. A fourth simulation result is acquired for the third net selection circuit. A fifth simulation result is acquired for the fourth net selection circuit.

Certain example embodiments will be described with reference to drawings. In the drawings, the same parts are designated by the same reference numerals and, once explained, the description thereof may be omitted with respect to subsequent drawings or embodiments.

A method for designing a semiconductor integrated circuit in the embodiment is applied to the circuit layout of a semiconductor integrated circuit described by a so-called net list including a plurality of nets. In this context, a "net" is a wiring for connecting circuit elements, such as transistors, to each other. In other words, the net is a wiring connecting a circuit element to another a circuit element at the same potential. A semiconductor integrated circuit to be designed in the embodiment is also called as "a circuit to be designed" below. The influence degree (degree of influence) of a parasitic element related to a net provided in the net list of a circuit to be designed on a circuit characteristic is output by the design method according to the embodiment. The greater the number of the parasitic elements having a large influence on the circuit characteristic, the larger the change in the circuit characteristic due to the parasitic elements.

Figure 1:
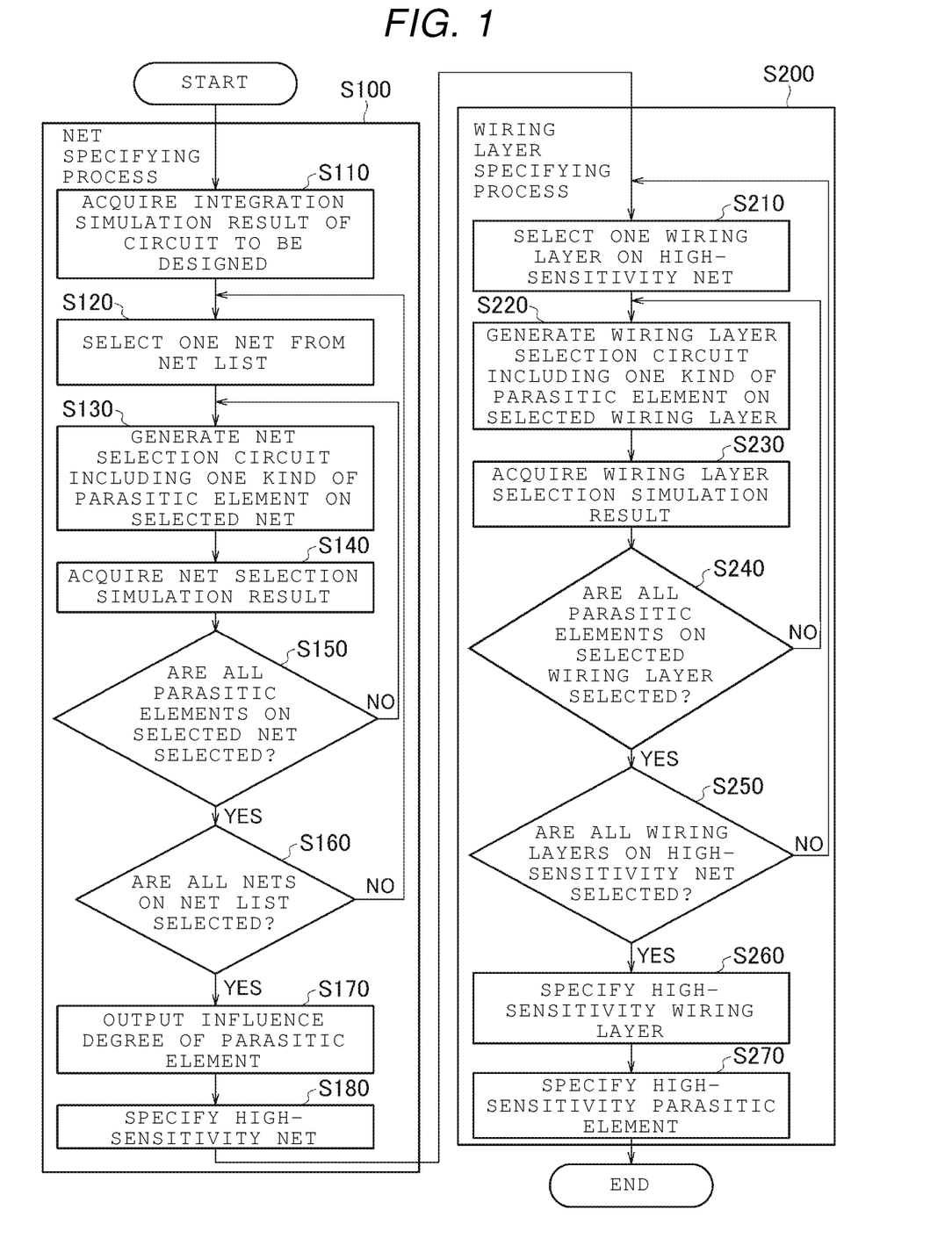
FIG. 1 is a flowchart for illustrating a method for designing a semiconductor integrated circuit according to an embodiment.

The method for designing a semiconductor integrated circuit according to the embodiment includes a net specifying process S100 and a wiring layer specifying process S200, as shown in FIG. 1. The net specifying process S100 identifies a net for which the influence of a parasitic element is relatively higher than that of other nets (hereinafter, called "high-sensitivity net") provided in the net list. The wiring layer specifying process S200 identifies a wiring layer upon which the influence of a parasitic element is relatively higher than that of other wiring layers (hereinafter, called "high-sensitivity wiring layer") including a high-sensitivity net.

Figure 2:
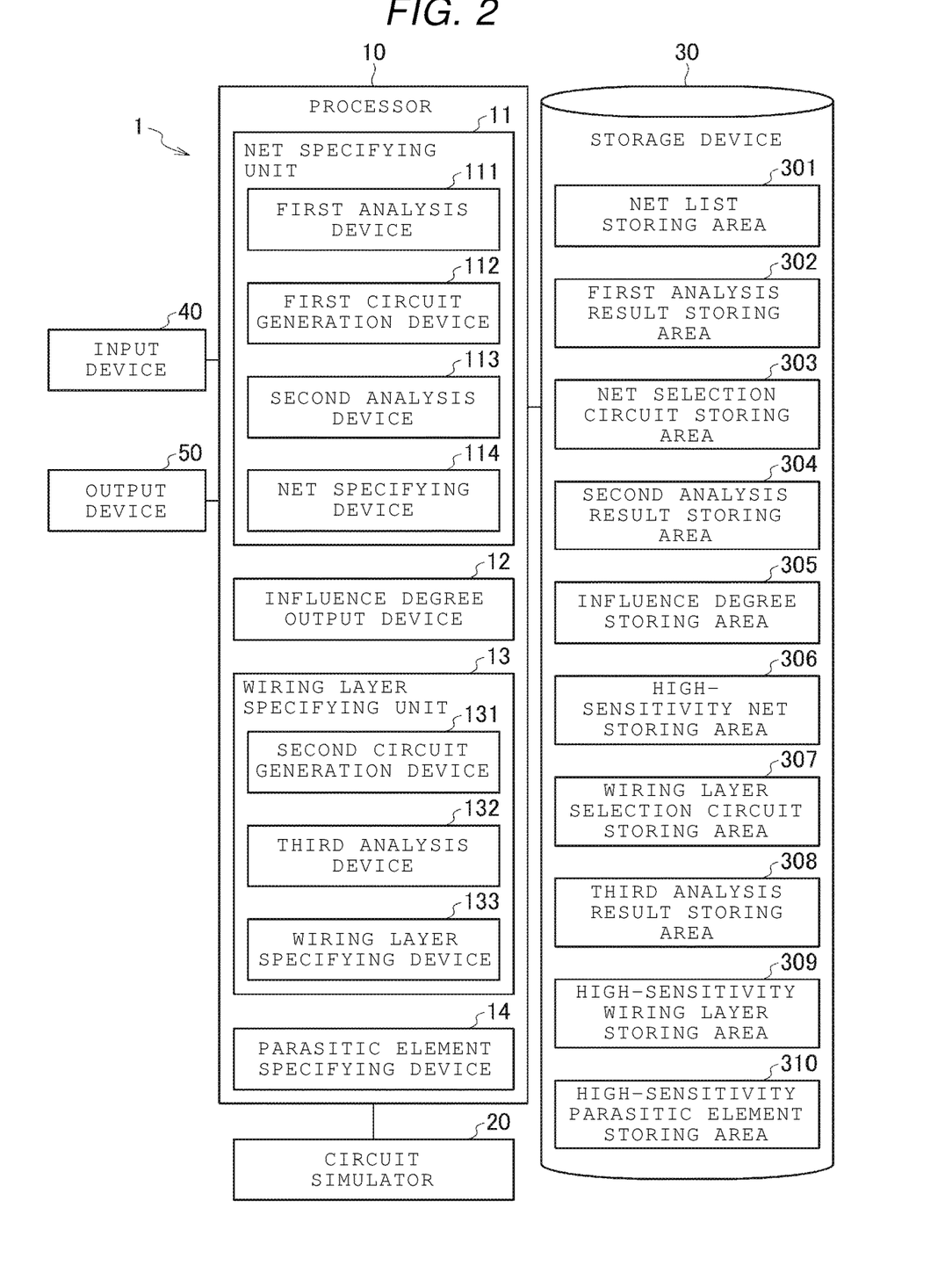
FIG. 2 is a schematic diagram showing a configuration of a circuit design system of the semiconductor integrated circuit according to the embodiment.

The design method shown in FIG. 1 can be executed by using a circuit design system 1 shown in FIG. 2, for example. The circuit design system 1 includes a processor 10, a circuit simulator 20, a storage device 30, an input device 40, and an output device 50.

The processor 10 has a net specifying unit 11, an influence degree output device 12, a wiring layer specifying unit 13, and a parasitic element specifying device 14. The net specifying unit 11 executes processing for specifying a high-sensitivity net. The net specifying unit 11 includes a first analysis device 111, a first circuit generation device 112, a second analysis device 113, and a net specifying device 114. The influence degree output device 12 outputs the influence degree of a parasitic element for each net (e.g., a value indicating the degree of influence the parasitic element has on a circuit characteristic of the circuit being designed). The wiring layer specifying unit 13 executes processing for specifying a high-sensitivity wiring layer. The wiring layer specifying unit 13 includes a second circuit generation device 131, a third analysis device 132, and a wiring layer specifying device 133. The parasitic element specifying device 14 specifies a parasitic element having an influence on a circuit characteristic larger than that of other parasitic elements.

The circuit simulator 20 executes a circuit simulation under the control of the processor 10. The storage device 30 stores data used by the processor 10 for processing, results obtained by the processing of the processor 10, and the like.

Data required for processing the processor 10 can be input from the input device 40. The input device 40 includes a keyboard, a mouse or a flexible disk device or the like. A circuit designer can designate input/output data from the input device 40. Further, the form of the output data can be set from the input device 40. An instruction such as execution or stopping of circuit design and can be input from the input device 40.

The processing result of the processor 10 is output from the output device 50. As the output device 50, a display for displaying the result of the circuit design, a printer or a storage device for storing the result of the circuit design in a computer readable storage medium may be used. Here, the "computer readable storage medium" means, for example, a medium capable of non-transitorily storing electronic data, such as an external memory device of a computer or a semiconductor memory.

Figure 3:
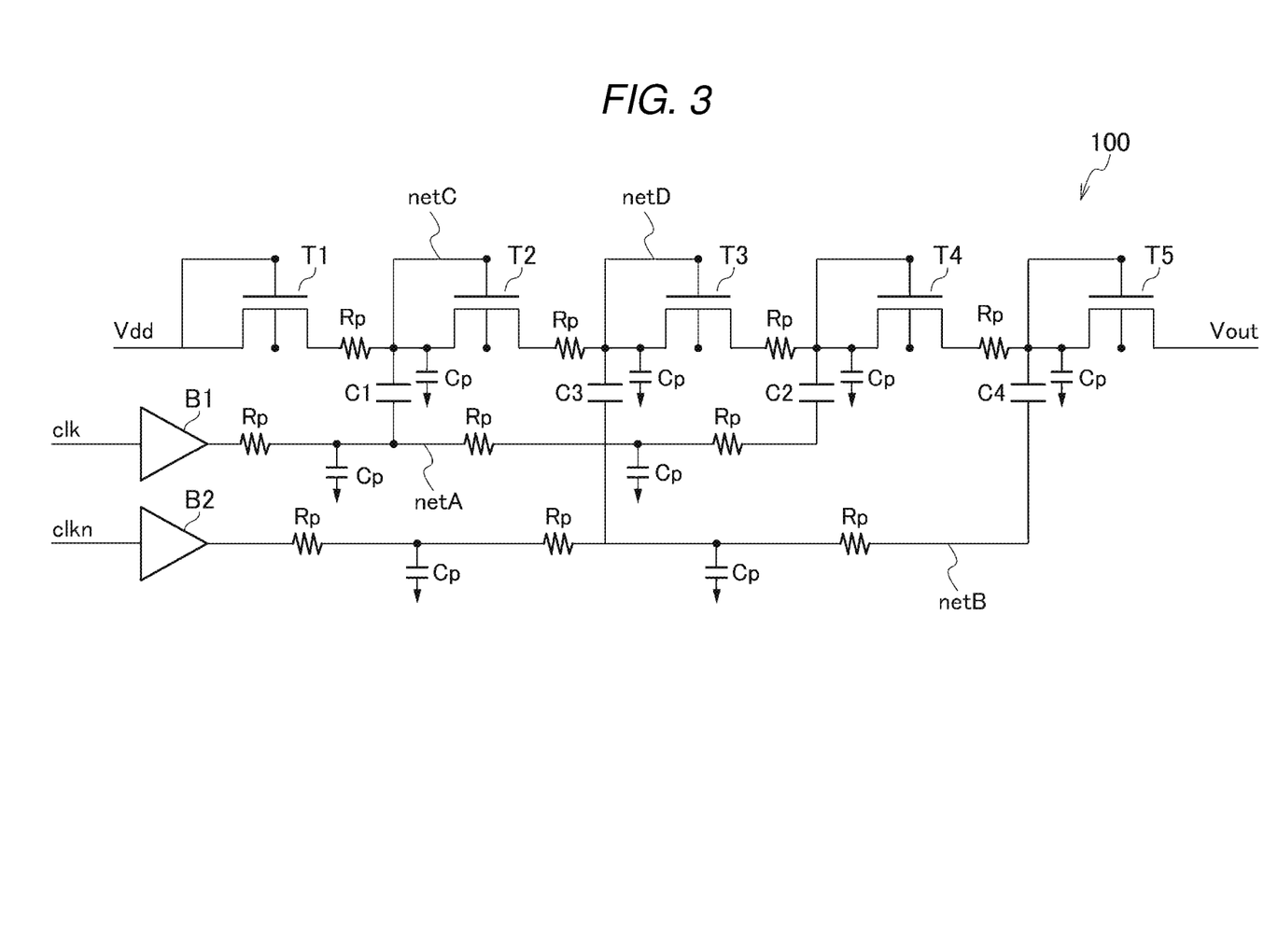
FIG. 3 is a schematic diagram showing an example of a circuit to be designed.

A signal circuit 100 is shown as an example of a circuit to be designed in FIG. 3. The signal circuit 100 has a signal propagation path for inputting an input signal Vdd and outputting an output signal Vout. The signal propagation path is configured by connecting transistors in series (e.g., a first MOS transistor T1 to a fifth MOS transistor T5). When such transistors (T1 to T5) are not required to be distinguished from each other in the description, they may be referred to as a MOS transistor T or collectively as MOS transistors T. In the MOS transistors T connected to each other, a first main electrode of one MOS transistor T and a second main electrode of another MOS transistor T are electrically connected to each other. For example, the first main electrode and the second main electrode are a source electrode and a drain electrode.

The input signal Vdd is input to the first main electrode and the gate electrode of the first MOS transistor T1. The output signal Vout is output from the second main electrode of the fifth MOS transistor T5.

The signal circuit 100 operates in response to a first clock signal clk input to the input terminal of a first buffer circuit B1 and a second clock signal clkn input to the input terminal of a second buffer circuit B2. When it is unnecessary to distinguish between the first buffer circuit B1 and the second buffer circuit B2 in the description, each may be referred to as a buffer circuit B or collectively as buffer circuits B.

The output terminal of the first buffer circuit B1 is connected via a first capacitor C1 to a connection point (node) between the first MOS transistor T1 and the second MOS transistor T2 and the gate electrode of the second MOS transistor T2. Further, the output terminal of the first buffer circuit B1 is also connected via a second capacitor C2 to a connection point between the third MOS transistor T3 and the fourth MOS transistor T4 and the gate electrode of the fourth MOS transistor T4.

The output terminal of the second buffer circuit B2 is connected via a third capacitor C3 to a connection point between the second MOS transistor T2 and the third MOS transistor T3 and the gate electrode of the third MOS transistor T3. Further, the output terminal of the second buffer circuit B2 is also connected via a fourth capacitor C4 to a connection point between the fourth MOS transistor T4 and the fifth MOS transistor T5 and the gate electrode of the fifth MOS transistor T5. When the first capacitor C1 to fourth capacitor C4 are not required to be distinguished, these capacitors can be referred to as a capacitor C or collectively as capacitors C.

The circuit design system 1 processes a circuit to be designed that is described by a net list. The net list lists a plurality of nets. In the signal circuit 100 shown in FIG. 3, a wiring connecting the MOS transistors T to each other, a wiring connecting a MOS transistor T to a capacitor C, a wiring connecting a buffer circuit B to a capacitor C, and the like are each a net listed in the net list. In FIG. 3, parasitic elements parasitic on the net are shown as a parasitic resistance Rp and a parasitic capacitance Cp.

In the signal circuit 100 shown in FIG. 3, netA is a signal line connecting the output terminal of the first buffer circuit B1 and the second capacitor C2. A netB is a signal line connecting the output terminal of the second buffer circuit B2 and the fourth capacitor C4. A netC is a signal line connecting the first capacitor C1, the first MOS transistor T1 and the second MOS transistor T2. A netD is a signal line connecting the third capacitor C3, the second MOS transistor T2 and the third MOS transistor T3. Other nets provided in the signal circuit 100 are not explicitly labelled as such.

An example of executing the design method according to the embodiment by the circuit design system 1 shown in FIG. 2 will be described below with reference to FIG. 1. Information of the net list including the parasitic elements of a circuit to be designed is stored in a net list storing area 301 of the storage device 30 via the input device 40, for example. The net list including the parasitic elements of a wiring may be generated from a graphic data system (GDS) file by, for example, a layout parasitic extraction (LPE) tool.

In step S110, the first analysis device 111 executes circuit simulation including all the parasitic elements to be evaluated for a circuit to be designed. Hereinafter, a simulation result acquired by a circuit simulation including all the parasitic elements to be evaluated is called "first simulation result". The signal circuit 100 shown in FIG. 3 depicts an example of a circuit including all the parasitic elements to be evaluated. The first analysis device 111 controls the circuit simulator 20 to calculate a first simulation result for the circuit to be designed. The first simulation result is stored in a first analysis result storing area 302 of the storage device 30.

The processing in step S120 to step S150 is repeated for each net on the net list. A net selected from the net list for processing is called the "selected net"). A circuit (hereinafter, called a "net selection circuit") including one kind of parasitic element parasitic on a selected net is generated for each parasitic element, and circuit simulation is performed for each of the net selection circuits having different kinds of parasitic elements. The result of the circuit simulation acquired for the net selection circuit is also called "net selection simulation result" below. That is, for each selected net, a net selection simulation result is acquired for each of the different kinds of parasitic elements to be evaluated. The processing of step S120 to step S150 is further described below.

Figure 4:
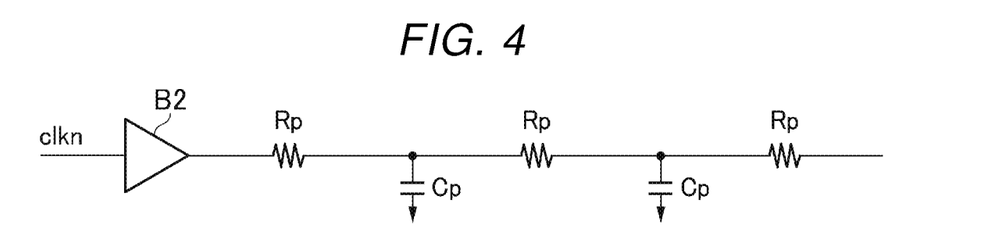
FIGS. 4 to 6 are circuit diagrams for illustrating a method for generating a net selection circuit.

In step S120, the first circuit generation device 112 selects one net from the net list. For example, as illustrated FIG. 4, netB connected to the output terminal of the second buffer circuit B2 is selected from the signal circuit 100 shown in FIG. 3.

Figure 5:
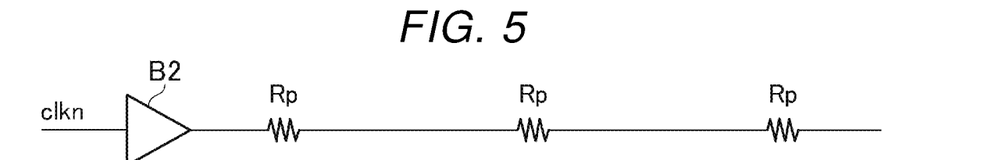
Figure 6:
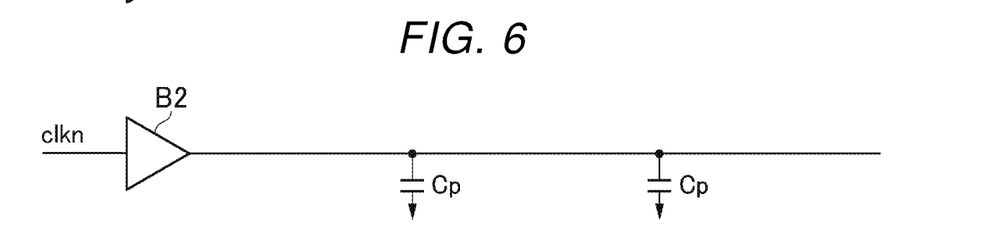

In step S130, the first circuit generation device 112 generates a net selection circuit including one kind of parasitic element parasitic on the selected net and all parasitic elements parasitic on the other nets besides the selected net. A separate net selection circuit is generated for each kind of parasitic element on the selected net. For example, the first circuit generation device 112 generates a net selection circuit including only the parasitic resistances Rp for the selected net as shown in FIG. 5. The first circuit generation device 112 also generates a net selection circuit including only the parasitic capacitances Cp for the selected net as shown in FIG. 6. The information corresponding to the generated net selection circuits is stored in a net selection circuit storing area 303 of the storage device 30.

For example, when a semiconductor integrated circuit is described by a net list including a first net and a second net (two nets) and parasitic elements to be evaluated are a first kind of parasitic element and a second kind of parasitic element (two types of parasitic elements), then a first net selection circuit to a fourth net selection circuit (four total) are generated. The first net selection circuit includes only the first kind of parasitic element parasitic on the first net, but can include the first kind of parasitic element and the second kind of parasitic element parasitic on the second net. The second net selection circuit includes only the second kind of parasitic element parasitic on the first net, but can include the first kind of parasitic element and the second kind of parasitic element parasitic on the second net. The third net selection circuit includes the first kind of parasitic elements and the second kind of parasitic elements parasitic on the first net, but only the first kind of parasitic elements parasitic on the second net. The fourth net selection circuit includes the first kind of parasitic elements and the second kind of parasitic elements parasitic on the first net, but only the second kind of parasitic elements parasitic on the second net. The first kind of parasitic element is, for example, the parasitic resistance Rp. The second kind of parasitic element is, for example, the parasitic capacitance Cp. A net selection circuit can be similarly generated for other nets.

In step S140, the second analysis device 113 reads the information of a net selection circuit from the net selection circuit storing area 303. The second analysis device 113 acquires a net selection simulation result from a circuit simulation for each of the net selection circuits having different kinds of parasitic elements that are parasitic on the selected nets. The second analysis device 113 controls the circuit simulator 20 to calculate a net selection simulation result for each of the net selection circuits having different kinds of parasitic elements. The net selection simulation result is stored in a second analysis result storing area 304 of the storage device 30.

For example, when a semiconductor integrated circuit is described by a net list including a first net and a second net, and parasitic elements to be evaluated are a first kind of parasitic element and a second kind of parasitic element, a first net selection circuit to a fourth net selection circuit are generated as described above. The second analysis device 113 acquires a net selection simulation result for the first net selection circuit to the fourth net selection circuit. That is, a second simulation result is acquired for the first net selection circuit. A third simulation result is acquired for the second net selection circuit. A fourth simulation result is acquired for the third net selection circuit. A fifth simulation result is acquired for the fourth net selection circuit. A simulation result is acquired in the same way for other net selection circuits.

In step S150, whether the first circuit generation device 112 has selected all the kinds of parasitic elements on the selected nets is checked. When all the kinds of parasitic elements on the selected nets have been selected, the processing proceeds to step S160. However, when there is a kind of parasitic element not yet selected, processing returns to step S130. The processing from step S130 to step S140 is repeated until a net selection simulation result is acquired for all of the net selection circuits having different kinds of parasitic elements that are parasitic on the selected nets.

In step S160, the first circuit generation device 112 determines whether all the nets in the net list have been selected as a selected net. When all the nets in the net list have been selected, the processing proceeds to step S170. However, when there is a net that is not yet selected, processing returns to step S120. The processing from step S120 to step S150 is repeated until a net selection simulation result is acquired for all of the nets having different kinds of parasitic elements. That is, a net selection simulation result is acquired for each net by the processing from step S120 to step S160. All nets in the net list might not be selected as a selected net, or a particular net may be excluded as a selection target.

In step S170, the influence degree output device 12 outputs the influence degree of parasitic elements in the first simulation result for each of the evaluated nets by using the net selection simulation result acquired for each of the nets. Specifically, the influence degree output device 12 reads the first simulation result stored in the first analysis result storing area 302 and the net selection simulation result stored in the second analysis result storing area 304. The influence degree output device 12 compares the first simulation result with the net selection simulation result and outputs the influence degree of parasitic elements on the first simulation result for each of the nets. The influence degree of the parasitic element output by the influence degree output device 12 is transmitted to the output device 50, for example. The output device 50 outputs the received influence degree of the parasitic elements. The influence degree of the parasitic elements may be stored in an influence degree storing area 305 of the storage device 30.

In step S180, the net specifying device 114 identifies a high-sensitivity net whose parasitic element influence on the first simulation result is relatively higher than that of other nets in the net list. The net specifying device 114 specifies a high-sensitivity net by mutually comparing the results of the net selection simulations acquired for each net. The information indicating the high-sensitivity net is stored in a high-sensitivity net storing area 306 of the storage device 30.

In this context, influence degree on the overall net simulation result is also called the "circuit characteristic sensitivity". The parasitic element of a net selection circuit which causes a large change in the simulation result for each net as compared to the comprehensive net simulation result has higher circuit characteristic sensitivity. For parasitic elements with high sensitivity, the circuit characteristic can be improved by taking measures to change or adjust the circuit layout so that the degree of influence on the circuit characteristic will be small. Since the identified high sensitivity elements have relatively large effect on the circuit characteristics, the effort for adjustment of such aspects will generally be more efficient than adjusting other elements that are not high sensitivity.

The relevant circuit characteristic is, for example, a ratio of the output to the input when the circuit to be designed is a boosting power supply. Such a ratio may be called "an efficiency ratio" or the like. Here, the efficiency ratio is the ratio of the output voltage to the input voltage, but may also be the ratio of the output current to the input current. The larger the change in efficiency ratio in a net selection simulation result from the comprehensive net simulation result, the higher the sensitivity of a parasitic element of the net selection circuit on efficiency ratio.

Figure 7:
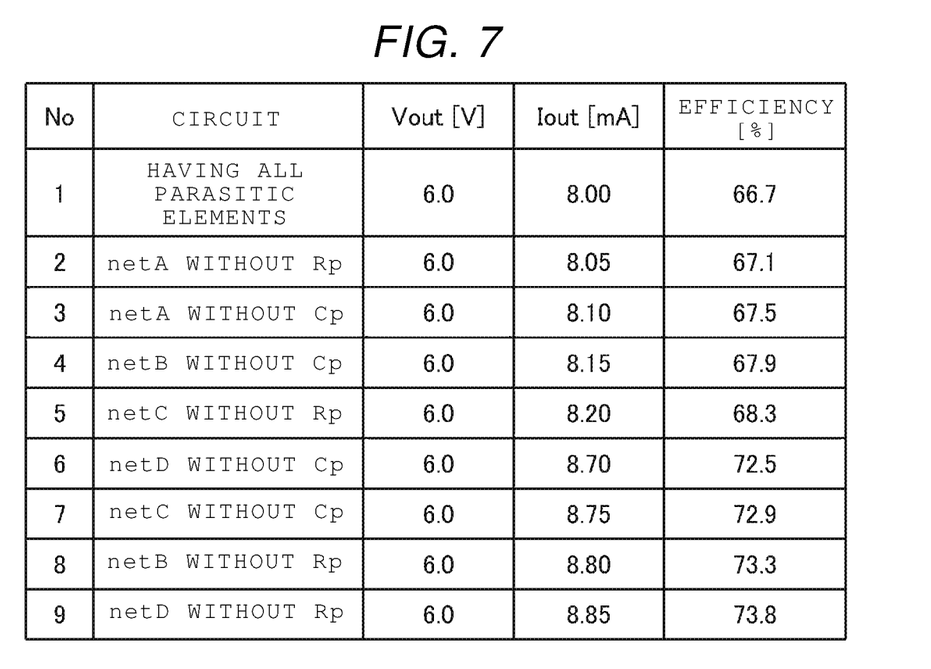
FIG. 7 is a table showing an example of influence degree of a parasitic element on a circuit characteristic of the circuit to be designed.

In FIG. 7, an example of the influence degrees of the parasitic elements acquired when the relevant circuit characteristic is an efficiency ratio. Here, the circuit to be designed has netA, netB, netC, and netD as shown in FIG. 3 as the nets provided in the net list. The parasitic elements parasitic on the nets are the parasitic resistances Rp and the parasitic capacitances Cp. The terms "Vout" and "Iout" are the voltage and current of a circuit output.

The circuit "having all parasitic elements" as listed in FIG. 7 is a circuit to be designed including all the parasitic elements to be evaluated. In other words, the "efficiency" value for the entry (No. 1) "having all parasitic elements" is value from the first simulation result. The listed circuit other than the circuit "having all parasitic elements" includes just one kind of parasitic element parasitic on a selected net, and is thus a net selection circuit including all parasitic elements parasitic on other the nets besides the selected net. For example, "netA without Rp" is a net selection circuit in which the parasitic resistance Rp parasitic on netA is excluded and the parasitic capacitance Cp parasitic on netA is provided.

The evaluated nets may be ranked according to the sensitivity. In FIG. 7, circuits are located in order of low efficiency to higher. Therefore, in a net selection circuit, the lower the rank of the "No." term, the less the change in efficiency with respect to the first simulation result (No. 1:66.7%). In FIG. 7, "netA without Rp" (No. 2: 67.1%), "netA without Cp" (No. 3: 67.5%) have a small change in efficiency. Therefore, the parasitic capacitance Cp of netA and the parasitic resistance Rp of netA are parasitic elements having low sensitivity (relatively little effect on the evaluated circuit characteristic). However, "netB without Rp" (No. 8: 73.3%) and "netD without Rp" (No. 9: 73.8%) cause a large change in efficiency. Therefore, the parasitic resistance Rp of netB and the parasitic resistance Rp of the netD are parasitic elements having high sensitivity (relatively large effect on the evaluated circuit characteristic).

As described above, the influence degree of the parasitic element on the circuit characteristic can be output by the design method according to the embodiment. Further, a net and a parasitic element having high sensitivity to the circuit characteristic can be identified by the design method according to the embodiment.

Returning to the description in FIG. 1, the wiring layer specifying process S200 is now described. Processing from step S210 to step S240 is repeated for each wiring layer one by one. That is, a circuit (hereinafter, called "wiring layer selection circuit") including one kind of parasitic element on a selected wiring layer is generated for each kind of the parasitic element, and circuit simulation is executed for each of the wiring layer selection circuits having different kinds of parasitic elements. The result of the circuit simulation acquired for a wiring layer selection circuit is also called "wiring layer selection simulation result". For each selection wiring layer, a wiring layer selection simulation result is acquired for each of the kinds of parasitic elements to be evaluated. The processing from step S210 to step S240 is additionally described below.

In step S210, the second circuit generation device 131 reads information regarding the high-sensitivity net(s) from the high-sensitivity net storing area 306. The second circuit generation device 131 selects one wiring layer from the wiring layers including a high-sensitivity net.

In step S220, the second circuit generation device 131 generates a wiring layer selection circuit including one kind of parasitic element that is parasitic on the selected wiring layer and all parasitic elements parasitic on the other wiring layers. The second circuit generation device 131 generates a wiring layer selection circuit for each kind of parasitic element. The information about the wiring layer selection circuit is stored in a wiring layer selection circuit storing area 307 of the storage device 30.

Figure 8:
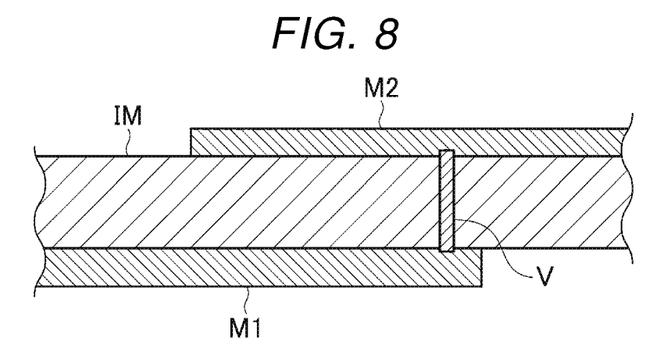
FIG. 8 is a cross-sectional diagram showing an example of a wiring layer that includes a net.

In the following, as shown in FIG. 8, the case where the wiring layer of a high-sensitivity net is composed of M1 and M2 layers (which are two wiring layers separated by an insulating layer IM) and a via V is described as an example. The via V penetrates the insulating layer IM and electrically connects the M1 layer and the M2 layer. The second circuit generation device 131 selects one of the M1 layer, the M2 layer, and the via V layer as a selected wiring layer. For example, when the M1 layer is the selected wiring layer, the wiring layer selection circuit includes one of the parasitic resistance or parasitic capacitance for the M1 layer, but includes both the parasitic resistance and parasitic capacitance for the M2 layer and the via V. Alternatively, the second circuit generation device 131 may select either the M1 layer or the M2 layer as a selected wiring layer without selecting the via V as a selected wiring layer.

Figure 9:
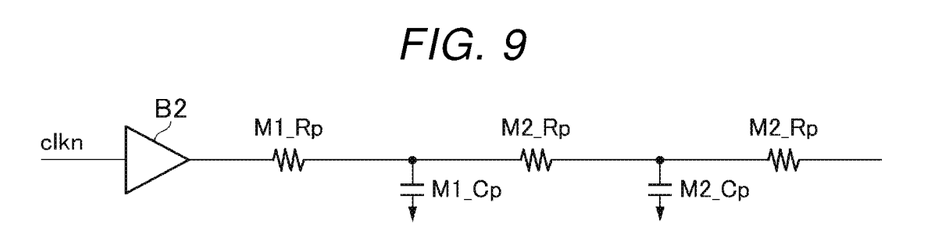
FIGS. 9 to 11 are circuit diagrams for illustrating a method for generating a wiring layer selection circuit.
Figure 10:
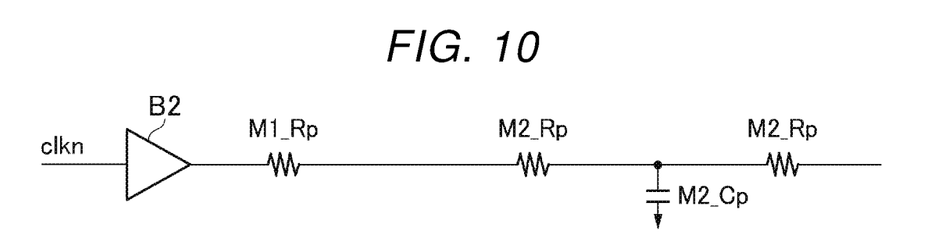
Figure 11:
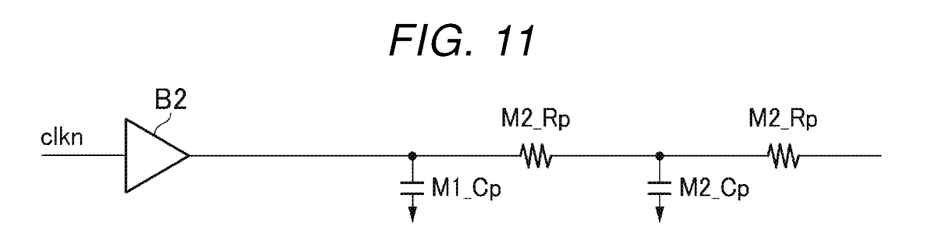

For example, in the high-sensitivity net shown in FIG. 9, a parasitic resistance M1_Rp and a parasitic capacitance M1_Cp are parasitic elements parasitic on the wiring of the M1 layer, and a parasitic resistance M2_Rp and a parasitic capacitance M2_Cp are parasitic elements parasitic on the wiring of the M2 layer. An example of a wiring layer selection circuit generated by the second circuit generation device 131 for the high-sensitivity net shown in FIG. 9 is shown in FIGS. 10 and 11. In the wiring layer selection circuit shown in FIG. 10, the selected wiring layer is the M1 layer and includes the parasitic resistance M1_Rp as a parasitic element of the wiring of the M1 layer. In the wiring layer selection circuit shown in FIG. 11, a selection wiring layer is again the M1 layer but includes the parasitic capacitance M1_Cp as a parasitic element of the wiring of the M1 layer.

After a wiring layer selection circuit is generated in step S220 in FIG. 1, the third analysis device 132 reads the information of the wiring layer selection circuit from the wiring layer selection circuit storing area 307 in step S230. Then, the third analysis device 132 acquires a wiring layer selection simulation result by circuit simulation for each of wiring layer selection circuits having different kinds of parasitic elements parasitic on the selected wiring layer. The third analysis device 132 controls the circuit simulator 20 to calculate a wiring layer selection simulation result for wiring layer selection circuits having different kinds of parasitic elements. The wiring layer selection simulation result is stored in a third analysis result storing area 308 of the storage device 30.

In step S240, the second circuit generation device 131 determines whether all the kinds of parasitic elements for the selected wiring layer have been selected. When all kinds of parasitic elements of the selected wiring layer have been selected, the processing proceeds to step S250. However, when there is a kind of parasitic element not yet selected, processing returns to step S220. The processing from step S220 to step S230 is repeated until a wiring layer selection simulation result is acquired for all wiring layer selection circuits having different kinds of parasitic elements parasitic on the selected wiring layer.

In step S250, the second circuit generation device 131 determines whether all wiring layers of a high-sensitivity net have been selected as a selected wiring layer. When all the wiring layers of the high-sensitivity net have been selected, the processing proceeds to step S260. However, when there is a wiring layer not yet selected, the processing returns to step S210. The processing from step S210 to step S240 is repeated until wiring layer selection simulation results are acquired for all the wiring layers of a high-sensitivity net. That is, a wiring layer selection simulation result is acquired for each wiring layer of the high-sensitivity net by the processing from step S210 to step S250.

In step S260, the wiring layer specifying device 133 identifies a high-sensitivity wiring layer whose parasitic element influence on the first simulation result is relatively higher than that of other wiring layers from the wiring layers including a high-sensitivity net. Specifically, the wiring layer specifying device 133 reads the wiring layer selection simulation results stored in the third analysis result storing area 308 to acquire the wiring layer selection simulation result for each of the wiring layers. The wiring layer specifying device 133 compares the first simulation result (read from the first analysis result storing area 302) with the wiring layer selection simulation result to identify a high-sensitivity wiring layer. The information about the high sensitivity wiring layer is stored in a high-sensitivity wiring layer storing area 309 of the storage device 30.

For example, when the high-sensitivity net includes a first wiring layer and a second wiring layer, the second circuit generation device 131 generates a first wiring layer selection circuit and a second wiring layer selection circuit. The first wiring layer selection circuit includes only a first kind of parasitic element parasitic on the first wiring layer, and includes the first kind parasitic element and a second kind parasitic element parasitic on the second wiring layer. The second wiring layer selection circuit includes the first kind of parasitic element and the second kind of parasitic element parasitic on the first wiring layer, and includes only the first kind of parasitic element parasitic on the second wiring layer. The third analysis device 132 acquires a first wiring layer selection simulation result for the first wiring layer selection circuit, and acquires a second wiring layer selection simulation result for the second wiring layer selection circuit. The wiring layer specifying device 133 compares the first simulation result with each of the first wiring layer selection simulation result and the second wiring layer selection simulation result. From the result of comparison, the wiring layer specifying device 133 specifies a wiring layer having a large influence on the first simulation result out of the first wiring layer and the second wiring layer.

Figure 12:
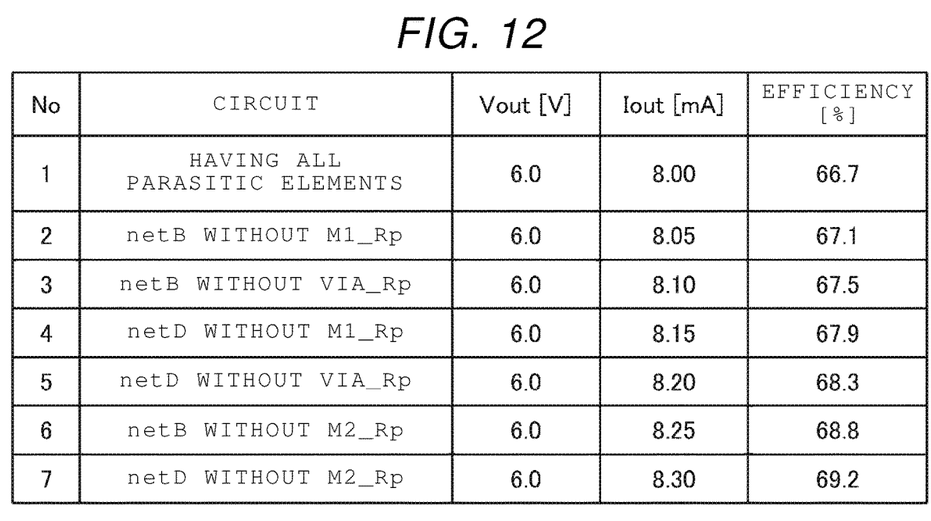
FIG. 12 is a table showing an example of influence degree of a parasitic element of a selected wiring layer.

In FIG. 12, an example of the influence degree of a parasitic element for each selected wiring layer acquired when the evaluated circuit characteristic is efficiency is shown. FIG. 12 shows the wiring layer selection simulation results of "netB without Rp" and "netD without Rp" which are the net selection circuits that were previously identified (see FIG. 7) as having a relatively large effect on efficiency. Namely, the high-sensitivity nets are netB and netD. The wiring layer selection circuits in this context are a circuit in which the parasitic resistance Rp is excluded from the M1 layer, the M2 layer, or the via V of netB or netD but the parasitic capacitance Cp is left. The result shown in FIG. 12 shows that the parasitic resistance Rp of the M2 layer of netB and netD has high sensitivity.

In step S270 of FIG. 1, the parasitic element specifying device 14 identifies a parasitic element whose influence degree on the first simulation result is relatively larger than that of other parasitic elements (hereinafter, "high-sensitivity parasitic element"). The parasitic element specifying device 14 identifies a high-sensitivity parasitic element by using the influence degree of a parasitic element on the first simulation result. For example, the parasitic element specifying device 14 may specify a high-sensitivity parasitic element by using the information of the high-sensitivity wiring layer specified by the wiring layer specifying device 133. That is, the parasitic element specifying device 14 may identify a high-sensitivity parasitic element from the parasitic elements parasitic on the high-sensitivity wiring layer by comparing the wiring layer selection simulation results acquired for each wiring layer. For example, the parasitic element specifying device 14 identifies the parasitic resistance Rp on the M2 layer of netB and the parasitic resistance Rp on the M2 layer of netD as a high-sensitivity parasitic element from the results shown in FIG. 12. The information about the high-sensitivity parasitic element is stored in a high-sensitivity parasitic element storing area 310 of the storage device 30.

Thus, the design method using the circuit design system 1 is completed.

As described above, in the method for designing a semiconductor integrated circuit according to the embodiment, sensitivity of the circuit characteristic is acquired for each parasitic element for each of the nets and wiring layers, and the influence degree of the parasitic element on the circuit characteristic is output. Since the influence degree can be acquired for each parasitic element, the layout can be changed in manner giving priority to changes affecting the parasitic elements causing a larger adverse effect on circuit characteristics. As a result, the circuit characteristic can be more efficiently improved. Therefore, it is less necessary to repeat the series of work of correcting/adjusting the layout and running circuit simulations until the circuit characteristic satisfies a predetermined specification. Thus, the increase of man-hours of layout design can be reduced.

That is, a circuit characteristic can be improved by taking measures to reduce the influence of the parasitic element(s) having a large effect on the circuit characteristic. For example, to reduce the parasitic resistance Rp, widening the width of a wiring and/or multiplexing of the wiring can be considered for a high-sensitivity net having a high sensitivity parasitic resistance Rp. The layout may be corrected so as to bypass a wiring having low sensitivity of the parasitic resistance Rp in order to shorten the wiring having a high sensitivity parasitic resistance Rp. Alternatively, the via provided in the high-sensitivity net may be enlarged or the number of the vias may be increased.

In order to improve a circuit characteristic, measures may be considered for a parasitic element having the higher order of sensitivity in addition to the parasitic element having the highest sensitivity to the circuit characteristic. For example, when it is difficult to change the layout of a parasitic element having a highest sensitivity, the layout of the parasitic element having the higher order of sensitivity can be changed to efficiently improve the circuit characteristic.

A series of a method for designing a semiconductor integrated circuit as shown in FIG. 1 can be executed by controlling the circuit design system 1 shown in FIG. 2 by a control program providing an algorithm equivalent to FIG. 1. The control program for executing an instruction for controlling the circuit design system may be stored in the storage device 30 including the circuit design system 1 shown in FIG. 2. The storage device 30 can be used as a non-temporary computer readable medium.

In the above, the case where the circuit characteristic is the efficiency of the boosting power supply has been described as an example, but the circuit characteristic is not limited to this. For example, the circuit characteristic may be a differential non-linearity error (DNL) or an integral non-linearity error (INL) of an analog/digital (AD) converter. The influence degree of a parasitic element on any circuit characteristic of a circuit to be designed can be output by the design method according to the embodiment.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A method for designing a semiconductor integrated circuit, the method comprising:
    acquiring a first simulation result by circuit simulation including a first kind of parasitic element and a second kind of parasitic element to be evaluated for a first net and a second net in a semiconductor integrated circuit described by a net list including the first net and the second net;
    generating a first net selection circuit including only the first kind of parasitic element on the first net and the first kind of parasitic element and the second kind of parasitic element on the second net;
    generating a second net selection circuit including only the second kind of parasitic element on the first net and the first kind of parasitic element and the second kind of parasitic element on the second net;
    generating a third net selection circuit including the first kind of parasitic element and the second kind of parasitic element on the first net and only the first kind of parasitic element parasitic on the second net;
    generating a fourth net selection circuit including the first kind of parasitic element and the second kind of parasitic element on the first net and only the second kind of parasitic element parasitic on the second net;
    acquiring a second simulation result for the first net selection circuit;
    acquiring a third simulation result for the second net selection circuit;
    acquiring a fourth simulation result for the third net selection circuit; and
    acquiring a fifth simulation result for the fourth net selection circuit.

2. The method according to claim 1, further comprising:
    identifying a high-sensitivity net out of the first net and the second net, the high-sensitivity net being the net having a larger influence on the first simulation result.

3. The method according to claim 2, wherein
    the high-sensitivity net includes a first wiring layer and a second wiring layer, and
    the method further comprises:
        generating a first wiring layer selection circuit including only the first kind of parasitic element on the first wiring layer and the first kind of parasitic element and the second kind of parasitic element on the second wiring layer;
        generating a second wiring layer selection circuit including the first kind of parasitic element and the second kind of parasitic element on the first wiring layer and only the first kind of parasitic element on the second wiring layer;
        acquiring a first wiring layer selection simulation result for the first wiring layer selection circuit;
        acquiring a second wiring layer selection simulation result for the second wiring layer selection circuit;
        comparing the first simulation result to the first wiring layer selection simulation result and the second wiring layer selection simulation result; and
    identifying which of the first and second wiring layers has a larger influence on the first simulation result based on the comparing of the first simulation result to the first and second wiring layer selection simulation results.

4. The method according to claim 3, wherein
    the first kind of parasitic element is a parasitic resistance, and
    the second kind of parasitic element is a parasitic capacitance.

5. The method according to claim 2, wherein the first simulation result provides a value for a circuit characteristic of the semiconductor integrated circuit and the degree of influence is based on values for the circuit characteristic from the acquired second simulation result, third simulation result, fourth simulation result, and fifth simulation result.

6. The method according to claim 5, wherein
    the first kind of parasitic element is a parasitic resistance, and
    the second kind of parasitic element is a parasitic capacitance.

7. The method according to claim 1, wherein
    the first kind of parasitic element is a parasitic resistance, and
    the second kind of parasitic element is a parasitic capacitance.

8. A circuit design system, comprising:
    a first analysis device configured to acquire a first simulation result by circuit simulation including a first kind of parasitic element and a second kind of parasitic element to be evaluated for a first net and a second net in a semiconductor integrated circuit described by a net list including the first net and the second net;
    a first circuit generation device configured to generate:
        a first net selection circuit including only the first kind of parasitic element on the first net and the first kind of parasitic element and the second kind of parasitic element on the second net,
        a second net selection circuit including only the second kind of parasitic element on the first net and the first kind of parasitic element and the second kind of parasitic element on the second net,
        a third net selection circuit including the first kind of parasitic element and the second kind of parasitic element on the first net and only the first kind of parasitic element on the second net, and
        a fourth net selection circuit including the first kind of parasitic element and the second kind of parasitic element on the first net and only the second kind of parasitic element parasitic on the second net; and a second analysis device configured to acquire:
a second simulation result for the first net selection circuit,
a third simulation result for the second net selection circuit,
a fourth simulation result for the third net selection circuit, and
acquires a fifth simulation result for the fourth net selection circuit.

9. The circuit design system according to claim 8, further comprising:
net specifying device configured to identify a high-sensitivity net out of the first net and the second net, the high-sensitivity net being the net having a larger influence on the first simulation result.

10. The circuit design system according to claim 9, wherein
the high-sensitivity net includes a first wiring layer and a second wiring layer, and
the circuit design system further comprises:
a wiring layer specifying unit configured to:
generate a first wiring layer selection circuit including only the first kind of parasitic element on the first wiring layer and the first kind of parasitic element and the second kind of parasitic element on the second wiring layer;
generate a second wiring layer selection circuit including the first kind of parasitic element and the second kind of parasitic element on the first wiring layer and only the first kind of parasitic element on the second wiring layer;
acquire a first wiring layer selection simulation result for the first wiring layer selection circuit;
acquire a second wiring layer selection simulation result for the second wiring layer selection circuit;
compare the first simulation result to the first wiring layer selection simulation result and the second wiring layer selection simulation result; and
identify which of the first and second wiring layers has a larger influence on the first simulation result based on the comparing of the first simulation result to the first and second wiring layer selection simulation results.

11. The circuit design system according to claim 10, wherein
the first kind of parasitic element is a parasitic resistance, and
the second kind of parasitic element is a parasitic capacitance.

12. The circuit design system according to claim 10, wherein the first simulation result provides a value for a circuit characteristic of the semiconductor integrated circuit and the degree of influence is based on values for the circuit characteristic from the acquired second simulation result, third simulation result, fourth simulation result, and fifth simulation result.

13. The circuit design system according to claim 12, wherein
the first kind of parasitic element is a parasitic resistance, and
the second kind of parasitic element is a parasitic capacitance.

14. The circuit design system according to claim 8, wherein
the first kind of parasitic element is a parasitic resistance, and
the second kind of parasitic element is a parasitic capacitance.

15. A non-transitory, computer-readable storage medium storing a control program which when executed by a circuit design system causes the circuit design system to perform a method comprising:
acquiring a first simulation result by circuit simulation including a first kind of parasitic element and a second kind of parasitic element to be evaluated for a first net and a second net in a semiconductor integrated circuit described by a net list including the first net and the second net;
generating a first net selection circuit including only the first kind of parasitic element on the first net and the first kind of parasitic element and the second kind of parasitic element on the second net;
generating a second net selection circuit including only the second kind of parasitic element on the first net and the first kind of parasitic element and the second kind of parasitic element on the second net;
generating a third net selection circuit including the first kind of parasitic element and the second kind of parasitic element on the first net and only the first kind of parasitic element parasitic on the second net;
generating a fourth net selection circuit including the first kind of parasitic element and the second kind of parasitic element on the first net and only the second kind of parasitic element parasitic on the second net;
acquiring a second simulation result for the first net selection circuit;
acquiring a third simulation result for the second net selection circuit;
acquiring a fourth simulation result for the third net selection circuit; and
acquiring a fifth simulation result for the fourth net selection circuit.

16. The non-transitory, computer-readable storage medium according to claim 15, the method further comprising:
identifying a high-sensitivity net out of the first net and the second net, the high-sensitivity net being the net having a larger influence on the first simulation result.

17. The non-transitory, computer-readable storage medium according to claim 16, wherein
the high-sensitivity net includes a first wiring layer and a second wiring layer, and
the method further comprises:
generating a first wiring layer selection circuit including only the first kind of parasitic element on the first wiring layer and the first kind of parasitic element and the second kind of parasitic element on the second wiring layer;
generating a second wiring layer selection circuit including the first kind of parasitic element and the second kind of parasitic element on the first wiring layer and only the first kind of parasitic element on the second wiring layer;
acquiring a first wiring layer selection simulation result for the first wiring layer selection circuit;
acquiring a second wiring layer selection simulation result for the second wiring layer selection circuit;
comparing the first simulation result to the first wiring layer selection simulation result and the second wiring layer selection simulation result; and
identifying which of the first and second wiring layers has a larger influence on the first simulation result based on the comparing of the first simulation result to the first and second wiring layer selection simulation results.

18. The non-transitory, computer-readable storage medium according to claim 16, wherein the first simulation result provides a value for a circuit characteristic of the semiconductor integrated circuit and the degree of influence is based on values for the circuit characteristic from the acquired second simulation result, third simulation result, fourth simulation result, and fifth simulation result.

19. The non-transitory, computer-readable storage medium according to claim 15, wherein
the first kind of parasitic element is a parasitic resistance, and
the second kind of parasitic element is a parasitic capacitance.

20. The non-transitory, computer-readable storage medium according to claim 15, the method further comprising:
storing the first net selection circuit, the second net selection circuit, the third net selection circuit, and the fourth net selection circuit in a storage device.

* * * * *